United States Patent [19]

Pietrolewicz

[11] 3,890,601

[45] June 17, 1975

[54] PASSWORD OPERATED SYSTEM FOR PREVENTING UNAUTHORIZED OR ACCIDENTAL COMPUTER MEMORY ALTERATION

[75] Inventor: John P. Pietrolewicz, Pennsauken, N.J.

[73] Assignee: Philco-Ford Corporation, Blue Bell, Pa.

[22] Filed: Mar. 11, 1974

[21] Appl. No.: 449,835

[52] U.S. Cl. .......... 340/172.5; 340/174.1

[51] Int. Cl. .......... G06f 13/04

[58] Field of Search .......... 340/172.5, 174.1; 444/1

[56] References Cited

UNITED STATES PATENTS

| | | | |
|---|---|---|---|
| 3,368,207 | 2/1968 | Beausoleil et al. | 340/172.5 |
| 3,377,624 | 4/1968 | Nelson et al. | 340/172.5 |
| 3,465,297 | 9/1969 | Thomas et al. | 340/172.5 |
| 3,562,717 | 2/1971 | Harmon et al. | 340/172.5 |
| 3,576,544 | 4/1971 | Cordero, Jr. et al. | 340/172.5 |
| 3,585,606 | 6/1971 | Evans et al. | 340/172.5 |
| 3,609,697 | 9/1971 | Blevins et al. | 340/172.5 |
| 3,744,034 | 7/1973 | Paul | 340/172.5 |
| 3,806,882 | 4/1974 | Clarke | 340/172.5 |

*Primary Examiner*—Gareth D. Shaw
*Assistant Examiner*—John P. Vandenburg
*Attorney, Agent, or Firm*—Robert D. Sanborn; Gail W. Woodward

[57] ABSTRACT

Manipulation of a digital computer magnetic memory is locked out to prevent unauthorized or accidental erasure. The memory is provided with a unique password. Unless the correct password is present in the computer, or entered into the computer by the operator, the computer will not run and the memory cannot be altered.

9 Claims, 1 Drawing Figure

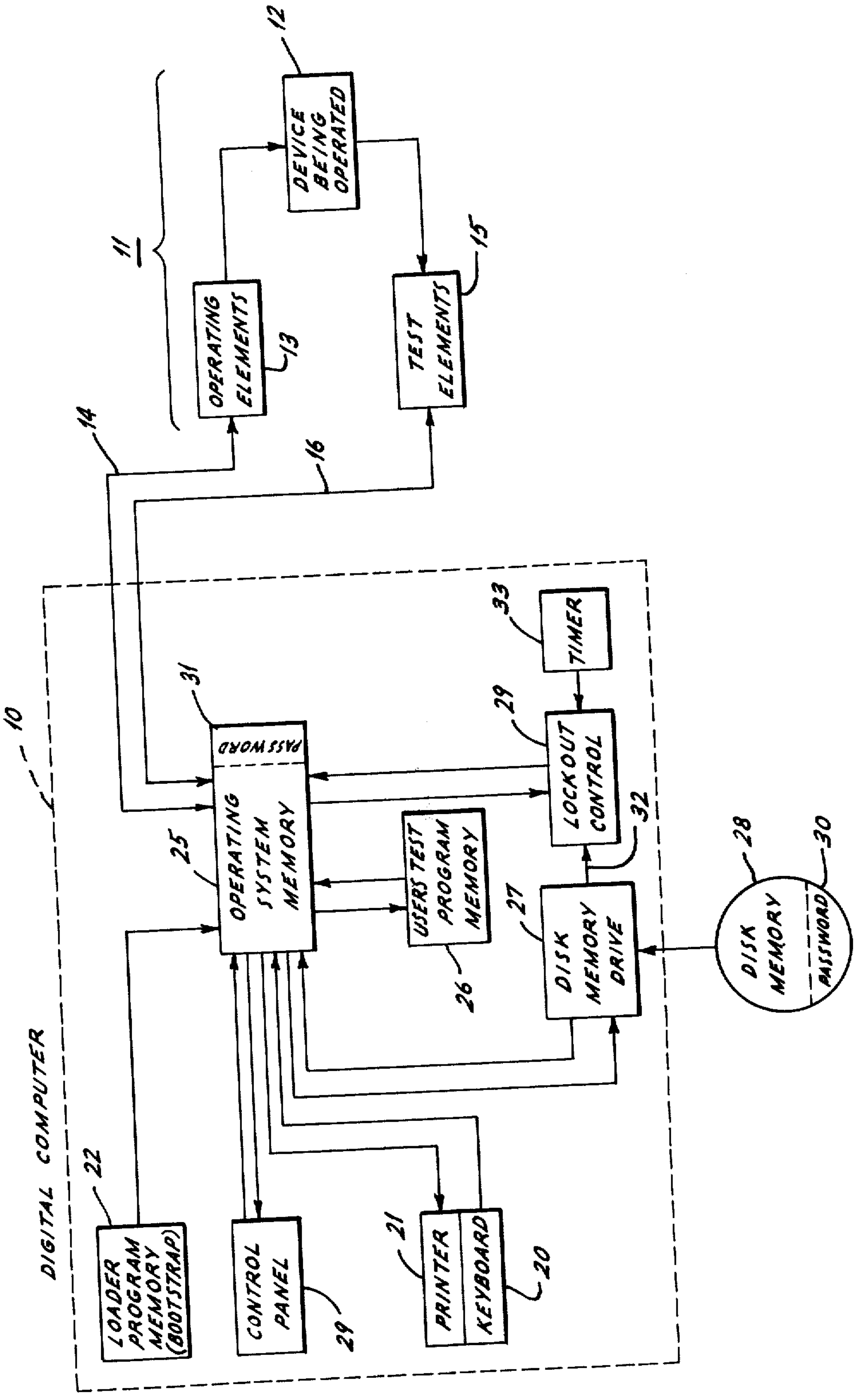
DIGITAL COMPUTER
LOADER PROGRAM MEMORY (BOOTSTRAP)
CONTROL PANEL
PRINTER
KEYBOARD
OPERATING SYSTEM MEMORY
PASSWORD
USERS TEST PROGRAM MEMORY
DISK MEMORY DRIVE
LOCKOUT CONTROL
TIMER
DISK MEMORY
PASSWORD
OPERATING ELEMENTS
TEST ELEMENTS
DEVICE BEING OPERATED
10
11
12
13
14
15
16
20
21
22
25
26
27
28
29
29
30
31
32
33

PASSWORD OPERATED SYSTEM FOR PREVENTING UNAUTHORIZED OR ACCIDENTAL COMPUTER MEMORY ALTERATION

BACKGROUND OF THE INVENTION

Digital computers have been adapted to process control operations using a wide variety of configurations. It is a common practice to employ a limited size high speed memory section in conjunction with a relatively slow large capacity memory section. Typically the high speed memory is of the semiconductor or magnetic core variety while the large capacity memory is usually of the magnetic disk variety. This configuration provides the necessary memory function while keeping the size of the computer relatively small because the bulk of the memory capability is in high volume density form. Computer speed is kept high by having a sufficiently large high speed memory section to accomodate a reasonable percentage of the computer operation. In operation all of the computer programs are contained in the large capacity section and only those programs in immediate use are contained in the high speed memory. Programs are called from the large capacity section as they are needed in the high speed memory operation.

Typically the high speed memory section has a portion of its capability set aside to store the programs that are used to run the entire computer. The remainder of the high speed memory section is used to store the programs needed for the immediate process control operations.

Since the large capacity memory is on a magnetic disk, each disk can control a relatively large scope of operations and a library of such disks will make the computer extremely flexible. However each disk must be complete in itself. That is each will contain not only a series of operating programs that can be addressed and transferred to a high speed memory for use, it must also contain the operating system programs required to manipulate the computer. Thus when a disk is inserted into the computer the operating system programs must first be transferred to the high speed memory section so that the computer can then run the stored operating programs.

In the interest of computer flexibility the computer is usually made capable of correcting program information. By this means performance can be updated or improved as desired. The new information is then entered back into the large scale memory system for future use.

One serious problem has occurred in this memory updating operation. If a new disk is inserted into the machine and the operator fails to transfer the operating system program information into the high speed memory section before making alterations in the memory, the information on the disk can be destroyed so as to be unrecoverable. Since this can be very costly to the user, it is highly desirable to find a way to avoid such memory destruction. One approach has been to incorporate mechanical interlocks into the computer so that accidental erasure is prevented. This approach has proven to be unwieldy and still does not prevent accidental erasure when the interlock is overridden. Additionally, it would be desirable to use an interlock device that can also be used to prevent access to the computer by unauthorized persons.

SUMMARY OF THE INVENTION

It is an object of the invention to provide means to prevent accidental or unauthorized erasure of the information in a large capacity computer memory of the magnetic disk variety.

It is a further object to prevent accidental or unauthorized information erasure in a computer memory disk by means of a password located in the information contained in the disk.

These and other objects are achieved in the following manner. A digital computer is provided with a large capacity disk memory system and a low capacity high speed memory section. A portion of the high speed memory section is devoted to storing the computer operating system programs which run the computer. The remainder of the high speed memory is used to store the operating programs that the computer uses to perform its intended function such as machine process control. The disk memory contains in addition to the operating system programs all of the functional or operating programs associated with a particular machine operation.

A password unique to each disk is located in a particular region of the disk. When the operating system programs are transferred from the disk to the high speed memory the password is also entered. The computer is provided with a lockout device that prevents computer operation unless the password in the disk agrees with the password in the high speed memory. Thus if a new disk is inserted into the computer the operating systems programs must be transferred from the new disk to the computer before disk memory alterations can be made. This prevents altering a disk memory with false information obtained from a prior disk.

In addition the computer can be operated so that the password is not entered automatically. In this case the operator must enter the password manually thus preventing use of the computer by unauthorized persons.

BRIEF DESCRIPTION OF THE DRAWING

The single FIGURE of drawing is a block diagram of a computer controlled system employing the invention.

DESCRIPTION OF THE INVENTION

In the block diagram of the drawing a digital computer 10 is shown inside the dashed outline. This computer is intended to operate an automated test machine 11 which includes the device being operated 12. This machine could, for example, be an automatic tester for evaluating the printed wiring boards used in a modular television receiver design. The tester, under computer control, identifies the board, which could be any one of the receiver complement, subjects it to a series of tests, and indicates whether the board is good or bad. Operating elements 13 include such items as power supplies, signal generators and such other operating elements as desired. These may be controlled or programmed by the computer by means of signals applied over line 14. The test machine also contains test elements 15. These may include voltmeters, frequency indicators, condition limit indicators, and other indicating circuitry. These devices are programmed and the test output information is fed over line 16 to and from the computer. The devices in blocks 13 and 15 are designed to operate in response to digital information from the computer, and the readouts return digital information back to the computer. Further details on test machine 11 can be found in copending application Ser. No. 455,023 filed Mar. 26, 1974.

Computer 10, includes the conventional power supplies and operating circuitry which are not shown. It is addressed with a keyboard 20 and provides output information on a printer 21. These latter devices are usually combined as shown into a single unit.

The computer is shown as having four separate memories but this is an arbitrary breakdown for convenience of discussion. Loader program memory 22 is often called the "bootstrap" loader. It is actually part of the rest of the memory system but is shown separately because it is fully protected. This means that it cannot be altered by the user. The loader program memory 22 contains the basic program information that is used to insert the operating system program into memory 25. Memory 25 sets what might be called the personality of the computer.

The rapid or high-speed memory portion of the computer typically uses magnetic core circuits or some equivalent and is shown in two parts. The operating system memory 25 contains the operating program and is used to communicate into and out of the system and to interconnect the various elements. The users test program memory 26 is substantially larger and is used to store operating data and the test programs needed to run machine 11.

To provide the main or bulk memory function a magnetic disk system is used. The computer has a disk memory drive 27, with which a magnetic disk memory 28 can be associated. Typically a single disk can store on the order of 750,000 words. The combined capabilities of memories 25 and 26 may be about 32,000 words, 10,000 of which are associated with operating system memory 25. It is desirable to keep the high-speed memory as small as possible because it is expensive and it takes up a substantial volume per word of storage capability as compared with a magnetic disk. The high-speed memories are made large enough to perform the required functions whereas the main information storage is in the disk. For example, typically a disk will contain one operating system program and up to 100 test programs. To show the difference in memory speed capability, memories 25 and 26 operate on a 2-microsecond cycle time. It might require as long as about 200 milliseconds to transfer or load a test program from disk 28 to program memory 26.

In the TV receiver example, a modular receiver could involve 14 different printed wiring boards. One disk would be associated with a particular receiver and the disk would contain one operating system program and 14 test programs (one for each board). Another receiver model, or perhaps another model year, would be associated with another disk.

The computer 10 also contains a conventional control panel 29 which includes the gross operating controls such as system emergency stop and restart and various test program control switches and indicator lamps.

In operation the first operating system program is developed on punched paper tape and read into the operating system memory 25 by means of an ordinary peripheral tape reader, not shown. This program would be duplicated once on the associated disk memory 28 using memory drive 27. Then a test program, associated with a particular circuit board is fed into the test program memory 25 using if desired another punched paper tape (not shown). This program is then transferred into disk memory 28 and identified as having a particular disk address location. This latter procedure is continued until each board has its test program located at a specified address on disk memory 28. Thus when a specified board is to be tested the appropriate program in the disk memory 28 is recalled and transferred or loaded into program memory 26 by the action of system memory 25.

The computer is made flexible in that while a particular test program is stored in program memory 26 it can be modified in accordance with instructions entered by way of keyboard 20 and operating system memory 25. Then the modified or updated program may be rerecorded on disk memory 28. This means that as test experience is gained, the associated computer programs can be improved upon over a period of time. In addition the operating system program, except for certain protected sections that are reserved for basic computer operations, can be changed or improved and the alterations transferred to the disk memory 28.

The system described thus far has two serious problems. First, it is clear that a casual operator can change programs by way of the keyboard. Thus unauthorized persons, through ignorance or design, can insert destructive information (or more properly misinformation) into the computer. Second, the user even though having no malicious intent, may produce accidental information destruction in the following manner. If a memory disk is changed, for example to test another series of circuit boards, the first thing that must be done is to transfer or load the operating system program from disk memory 28 to operating system memory 25. This is necessary so that the operating system program has the correct address information for the other disk memory programs. If for some reason, such as ordinary carelessness, the operator inserts a new disk and does not transfer the operating system programs, any corrections to be made in the test program will be incorrectly addressed on the disk. Thus any corrections are wrongly entered thereby causing destruction of a portion of the disk information.

To overcome the above problems.a lockout control 29 is added to the computer. The operating system program contains the instructions on how the lockout control 29 operates and several modes of operation are available. In one mode the operating program will only allow the user to transfer information from disk memory 28 to the computer and operate the test machine 11. In a second mode the user can make corrections in test program memory 26 but not disk memory 28. In a third mode, which is called the unlocked mode, the user is allowed to change information in memories 25, 26, and 28.

In order to invoke the fully unlocked mode a "password" is employed. When a disk memory is first produced, a small portion of the operating system program is set aside as a protected area and a series of characters representing a unique word entered therein. This area is represented as portion 30 of disk memory 28.

An equivalent portion of operating system memory 25, labeled 31, is set aside to provide storage of the password therein. It should be noted that a password involving a few characters will not seriously detract from the memory capability.

Lockout control 29, by way of operating system memory 25, is arranged to halt computer operation when the passwords in sections 30 and 31 do not match. In the normal course of use, when a disk is inserted into the computer the first action will be to load the operating program from the disk into operating system memory 25. This will include the password located in section 30 which gets loaded into memory 25 as part of the operating system. Section 31 is loaded with a nonsense password which is different from that of password 30. The user then types in the appropriate command to fully unlock the system via keyboard 20. The computer responds by typing out a request for a password. The user then types in a password which the operating system stores in section 31 of memory 25. The computer then compares the submitted password 31 with the reference password 30 loaded from the disk. If they agree, the system becomes fully unlocked and an appropriate indicator lamp on the control panel 29 is turned on. If the submitted password is incorrect, an error message is typed out on printer 21 and the system remains in a locked state. Any subsequent attempt to alter the disk memory will be prohibited by a similar comparison of passwords and resultant error message. In order for the user to run the computer he must enter the correct password into section 31 and to do this he must know the password associated with the disk he wants to use.

In addition to password comparison, the lockout control 29 can receive information from timer 33 and disk memory drive 27 by way of line 32. Line 32 is connected to the stop or low-speed circuits of disk memory drive 27 so that whenever a disk is changed, the lockout control 29 can sense it. Thus the system can be caused to revert to a particular lockout mode as described above in response to either time or disk changes.

EXAMPLE

A Hewlett Packard HP2116C computer was modified to provide the abovedescribed lockout operation. The system used the language called BASIC (Beginner's All-purpose Symbolic Instruction Code). The password sections involved up to eight alphanumeric characters. A relay coil was connected across the disk drive "stop" indicator lamp so that the relay contacts would close when the disk drive was stopped pursuant to a disk change. The relay contacts were connected to the computer power failure logic circuitry to halt computer operation when the disk drive stopped. Just prior to the halt of computer operation the power fail logic circuitry will cause the computer to interrupt whatever it was doing and jump to a designated portion of the Lockout Control 29 program called "PLOCK". This program caused the password stored in the operating system memory to be clobbered with a bit pattern which cannot be matched by any characters submitted from the keyboard. This will force a system reload from disk 28 before a valid password can be submitted from the keyboard.

The computer program was designed so that when the sequence "JSB LOKCK" was entered the passwords were compared. If they matched the operator continued. If a mismatch was found, the computer refused to run and printed out "SORRY! YOU'RE LOCKED OUT". In this case, the transfer was initiated and the operator would try again.

The computer was programmed to revert to the PLOCK or permanent lockout state when a disk was removed from the machine. This state also involved automatic erasure of the password portion of the operating system memory. When premature write or a change in program were attempted, the lockout would be invoked and the computer would print out "SORRY! YOU'RE LOCKED OUT. SYS LOAD FROM DISK REQ'D". The PLOCK state could be overcome by first loading the operating system memory from the disk memory and then addressing the command "UNLOCK". The system would then request submission of the password associated with the disk. When the correct password was inserted into the memory, the machine would then unlock and respond to new data.

The machine could also be placed in two other modes. In the "DLOCK" mode the disk only was locked out. Programs could be loaded from the disk into the program memory, and the programs could be altered and/or run. However, in this mode the disk memory could not be altered.

In the "LOCK ALL" mode the operator could only load the program memory from the disk and run. No changes in either disk or program memory could be made.

Either DLOCK or LOCK ALL could be unlocked, if no change in disk had been made, by addressing the command UNLOCK as described above.

In addition to the above, the system was set to automatically revert to DLOCK 4 hours after the last UNLOCK sequence and at the start of each calendar day.

The modified computer was used to control a machine that was used in the automatic testing of electronic modules. Details of this machine are disclosed in above-mentioned co-pending application Ser. No. 455,023 filed Mar. 26, 1974.

The invention has been described and an operating example of its use has been set forth. Clearly modifications and equivalents of what has been shown will occur to a person skilled in the art. For example, the invention has been described in terms of a disk memory. Tape or drum memory could also be used. Also the memory configurations could be substantially different and other peripheral as well as controlled equipment could be employed. Accordingly, it is intended that the invention be limited only by the following claims.

I claim:

1. In a digital computer used to control the operation of a machine, said computer including, a high-speed operating system memory adapted to contain the computer system operating programs, a high-speed program memory adapted to contain at least one of a plurality of the programs used to operate said machine, input and output means for operating and observing the operation of said computer, a low-speed memory device having replaceable easily stored permanent memory elements, said low-speed memory device being capable of storing substantially more information than said high-speed memories thereby permitting storage of said plurality of programs along with the operating system programs and having a protected portion wherein stored information cannot be altered by said computer, said protected portion containing a password that is unique to each one of said memory elements, and means for transferring information between said high-speed memories and said low-speed memory; an automatic lockout device comprising:

means for comparing the password in said high-speed operating system memory and the password in said low-speed memory, and means to prevent alteration of information in said low-speed memory when the passwords in said high-speed operating system memory and said low-speed memory do not match.

2. The computer of claim 1 wherein said computer includes means for transferring automatically said password to said high-speed operating system memory from said low-speed memory.

3. The computer of claim 1 wherein said computer includes operator controlled means for entering said password in said high-speed operating system memory.

4. The computer of claim 1 wherein said lockout device includes means to prevent altering information to said low-speed memory and said high-speed program memory.

5. The computer of claim 1 wherein said lockout device includes means for operation in accordance with user commands entered via said input means.

6. The computer of claim 1 wherein said lockout device is operated by means of a pushbutton on a control panel.

7. The computer of claim 1 wherein said low-speed memory is a magnetic disk memory.

8. The computer of claim 7 wherein means responsive to removing a disk from said disk memory actuate said lockout device.

9. The computer of claim 8 wherein said lockout device includes means to automatically operate said lockout device after a predetermined time following the last disk memory removal operation.

* * * * *